United States Patent
Jovicevic

(10) Patent No.: US 7,195,302 B2
(45) Date of Patent: Mar. 27, 2007

(54) VEHICLE REAR SEATING ARRANGEMENT

(75) Inventor: Niko Jovicevic, Livonia, MI (US)

(73) Assignee: Nissan Technical Center North America, Inc. MI (US)

( * ) Notice: Subject to any disclaimer, the term of this patent is extended or adjusted under 35 U.S.C. 154(b) by 0 days.

(21) Appl. No.: 11/207,947

(22) Filed: Aug. 22, 2005

(65) Prior Publication Data
US 2007/0040406 A1    Feb. 22, 2007

(51) Int. Cl.
*B60N 2/02* (2006.01)
*B60N 2/62* (2006.01)

(52) U.S. Cl. ............................. 296/65.01; 296/65.05; 297/14; 297/423.27

(58) Field of Classification Search ............. 296/65.01, 296/65.05, 37.15, 37.14, 37.8, 188.08, 188.09, 296/188.1; 297/14, 423.27, 335
See application file for complete search history.

(56) References Cited

U.S. PATENT DOCUMENTS

| | | | | |
|---|---|---|---|---|
| 1,387,911 A * | 8/1921 | Shefts | ........................ | 297/63 |
| 2,432,072 A * | 12/1947 | Trautvetter | ............ | 297/423.27 |
| 4,191,417 A * | 3/1980 | Ferrara | .................... | 296/65.05 |
| 6,179,362 B1 * | 1/2001 | Wisniewski et al. | ..... | 296/65.01 |
| 6,398,291 B1 * | 6/2002 | Reusswig et al. | ........ | 296/186.4 |
| 6,439,636 B1 * | 8/2002 | Kuo | ........................ | 296/65.09 |
| 6,460,922 B1 * | 10/2002 | Demick | ........................ | 297/14 |
| 6,488,327 B1 * | 12/2002 | Pearse et al. | ............ | 296/65.05 |
| 6,499,787 B2 * | 12/2002 | Jach et al. | ................ | 296/65.09 |
| 6,540,279 B1 * | 4/2003 | Bargiel | ..................... | 296/65.05 |
| 6,752,443 B1 * | 6/2004 | Thompson et al. | ...... | 296/24.34 |
| 6,883,854 B2 | 4/2005 | Daniel | | |
| 2004/0195900 A1 * | 10/2004 | The et al. | ................. | 297/463.2 |
| 2005/0121956 A1 * | 6/2005 | Dolan et al. | ................. | 297/253 |

OTHER PUBLICATIONS

Toyota Motor Sales, U.S.A., Inc.: Tacoma Access Cab 4×4 V6 interior; Photos: http://www.toyota.com/tacoma/interior.html.

* cited by examiner

*Primary Examiner*—D. Glenn Dayoan
*Assistant Examiner*—Greg Blankenship
(74) *Attorney, Agent, or Firm*—Global IP Counselors

(57) ABSTRACT

A vehicle rear seating arrangement is described that includes a vehicle passenger compartment structure and a seat assembly. The seat assembly includes a seat attachment part, a seat bottom portion with an upper seating surface and a seat extension portion with an extension seating surface. The seat attachment part is fixedly attached to the vehicle passenger compartment structure. The seat extension portion is supported by the seat assembly for movement between a stowed position underneath the seat bottom portion and a seat extending position in which the upper seating surface and the extension seating surface are generally aligned.

18 Claims, 9 Drawing Sheets

VEHICLE REAR SEATING ARRANGEMENT

BACKGROUND OF THE INVENTION

1. Field of the Invention

The present invention generally relates to a vehicle seat structure. More specifically, the present invention relates to a vehicle rear seating arrangement that includes a seat with a retractable extension portion that enlarges the horizontal area defined by the seat.

2. Background Information

Many vehicles have a second row (rear) of seats that fold from a use position to a storage position to increase the cargo area of the vehicle. In some vehicles, the backrest portion of the seat folds down to enlarge the cargo area, while in other vehicle, the seat portion of the seat folds up to enlarge the cargo area. In the case of pickup trucks and some smaller vehicles, the rear seating area is quite small. Thus, in vehicle with a minimal rear seating area, the depth of the seat portion of the seat is sometimes shortened to provide adequate leg room for passengers. However, the minimal seat depth of such rear seats may not have sufficient depth to support a child safety seat.

In view of the above, it will be apparent to those skilled in the art from this disclosure that there exists a need for an improved rear seat that provides adequate space for carrying cargo, passengers or a child safety seat without modification to the vehicle passenger compartment. This invention addresses this need in the art as well as other needs, which will become apparent to those skilled in the art from this disclosure.

SUMMARY OF THE INVENTION

It has been discovered that in various vehicle rear seating arrangements, an increase in the size of the seating surface of a rear seat allows the use of a child safety seat.

One object of the present invention to provide a rear seating arrangement with a retractable seat extension that adds flexibility to the use of a small rear seat.

In accordance with one aspect of the present invention, a vehicle rear seating arrangement includes a vehicle passenger compartment structure and a seat assembly. The seat assembly includes a seat attachment part, a seat bottom portion with an upper seating surface and a seat extension portion with an extension seating surface. The seat attachment part is fixedly attached to the vehicle passenger compartment structure. The seat extension portion is supported by the seat assembly for movement between a stowed position underneath the seat bottom portion and a seat extending position such that the upper seating surface and the extension seating surface are generally aligned in the seat extending position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
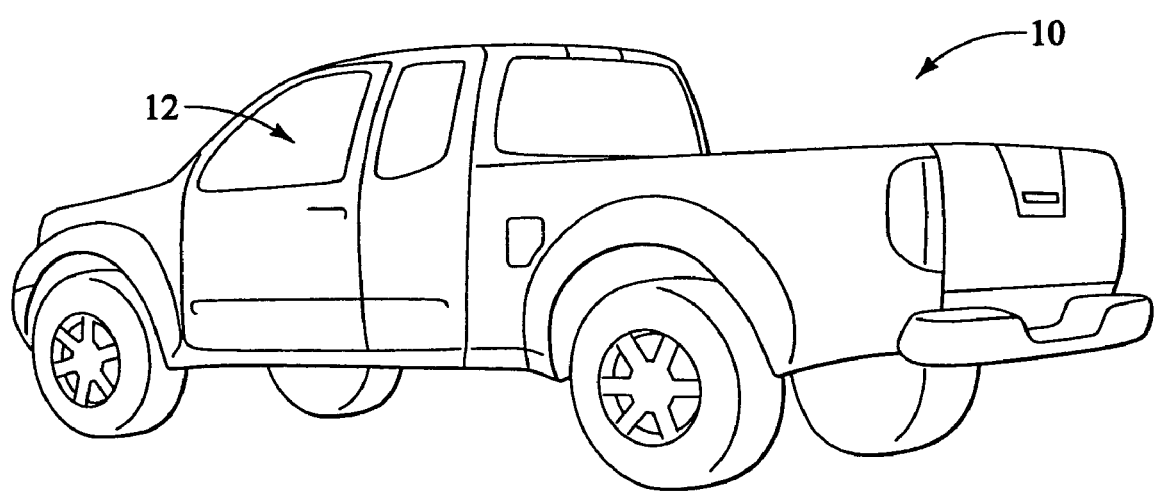
FIG. 1 is a side elevational view of a pickup truck that includes a rear seating arrangement in accordance with the present invention.

Referring initially to FIGS. 1–5, a vehicle 10 with a passenger compartment 12 is illustrated in FIG. 1 that is equipped with a rear seating arrangement (FIGS. 2–5) in accordance with a preferred embodiment of the present invention. As shown in FIGS. 2–5, the passenger compartment 12 is provided with a rear seating arrangement having at least one rear seat assembly 14, and preferably two rear seat assemblies 14 as shown. Each rear seat assembly 14 includes a retractable structure that provides flexibility to space within the passenger compartment or vehicle cabin 12, as is described in greater detail below. Specifically, the seat assembly 14 of the present invention allows the space within the passenger compartment to be used for cargo space, as a passenger space or as a space to install a child safety seat S (FIG. 11).

The passenger compartment 12 is illustrated as a pickup-up truck in FIG. 1. However, the present invention can be used in other types of vehicles as needed and/or desired. Since passenger compartments of vehicle differ from vehicle to vehicle, the passenger compartment 12 will only be describe as necessary to understand the rear seating arrangement of the present invention. The passenger compartment 12 includes a floor 16 and a rear wall 18 as well as other structures. The floor 16 is a generally horizontal surface of the passenger compartment 12, while the rear wall 18 is a generally vertical surface of the passenger compartment 12. As described in greater detail below, each rear seat assembly 14 is fixedly supported on the rear wall 18 for movement between a normal passenger use position (FIG. 3), a storage position (FIG. 4) and a child safety seat use position (FIG. 5). The passenger compartment 12 is also provided with a pair of front seating arrangements 20 that is supported on the floor 16. The precise construction of the front seating arrangements 20 are not important to the present invention and thus will not be discussed herein. Thus, the front seating arrangements 20 can be any type of seating that is available.

Figure 6:
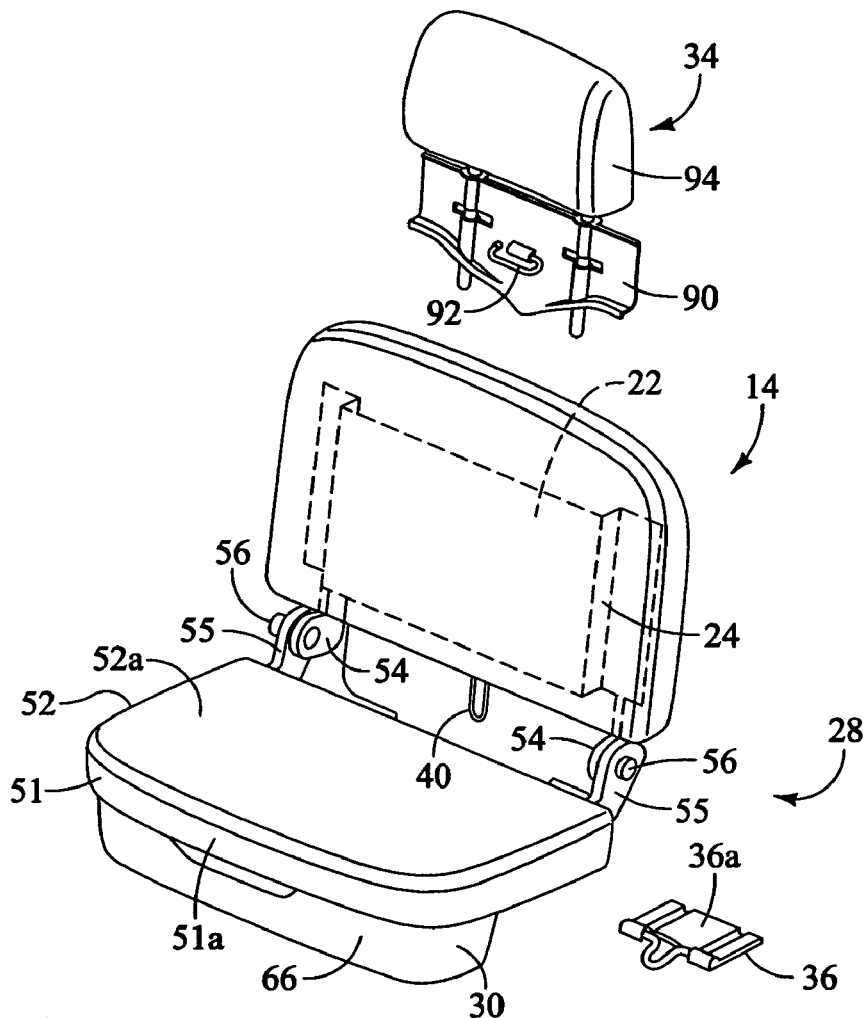
FIG. 6 is an exploded perspective view of one rear seat of the rear seating arrangement showing the extension portion in the stowed position in accordance with the present invention.
Figure 7:
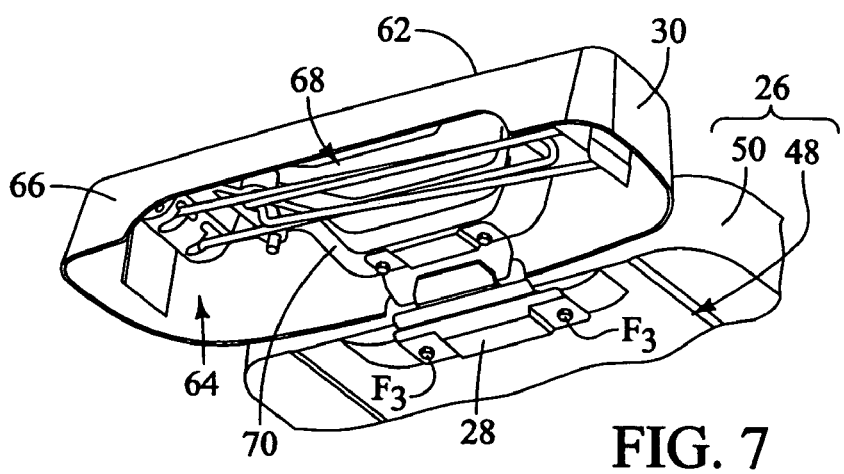
FIG. 7 is another partial perspective view showing the underside of the rear seat with support legs of the extension portion in a retracted or stowed position in accordance with the present invention.

As shown in FIGS. 6 and 7, each of the rear seat assemblies 14 basically includes a seat attachment part 22, a seat back portion 24, a seat bottom portion 26, a main seat hinge 28, a seat extension portion 30 and an extension seat hinge 32. Generally speaking, in the illustrated embodiment, the seat back portion 24 is fixed to the rear wall 18 of the passenger compartment 12 by the seat attachment part 22 with the seat bottom portion 26 being pivotally attached to the seat back portion 24 and the seat extension portion 30 being pivotally attached to the seat bottom portion 26. However, the seat bottom portion 26 can be pivotally attached directly to the rear wall 18 of the passenger compartment 12 if needed and/or desired.

Figure 11:
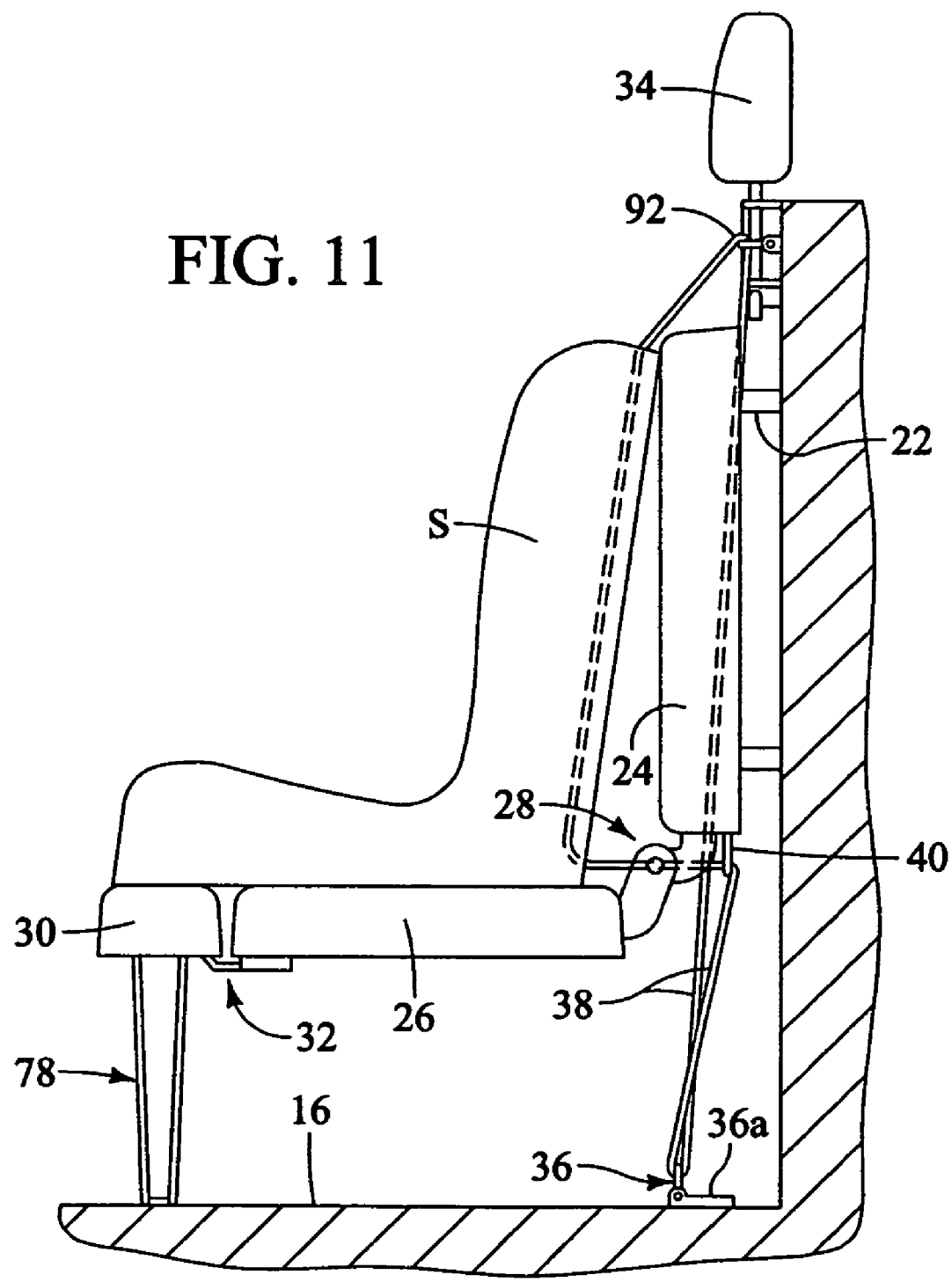
FIG. 11 is a side view of the rear seat arrangement showing a pair of tethers for securing a child safety seat in accordance with the present invention.

Preferably, each of the rear seat assemblies 14 further includes a headrest assembly 34 and a tether hook 36 for securing a child safety seat S using a pair of child restraining seat tethers 38 (see FIGS. 4, 6, 8 and 11). The headrest assembly 34 is fixedly attached to the rear wall 18 of the passenger compartment 12, as shown in FIG. 11, while the tether hook 36 is fixedly attached to the floor 16 of the passenger compartment 12. In the illustrated embodiment, the tether hook 36 is shared between the rear seat assemblies 14 such that the tether hook 36 can be used with either or both of the rear seat assemblies 14. Alternatively, each of the rear seat assemblies 14 can have its own tether hook 36 as needed and/or desired.

Regarding the seat attachment part 22, any type of attachment structure can be used to fixedly secure the seat back portion 24 to the rear wall 18 of the passenger compartment 12. Thus, precise construction of the seat attachment part 22 will not be discussed or illustrated in detail herein. Rather, it will be apparent to those skilled in the art from this disclosure that any attachment type can be used to carry out the present invention. For example, the seat attachment part 22 can merely be a metal support bracket secured to the seat back portion 24 with the seat attachment part 22 (support bracket) being fastened by a plurality of fasteners, such as bolts, to the rear wall 18 of the passenger compartment 12. The lower end of the seat attachment part 22 includes part of the main seat hinge 28 for pivotally coupling the seat bottom portion 26 to the seat back portion 24 between the horizontal seating position shown in FIGS. 2 and 3, and a vertical retracted or storage position as shown in FIG. 4.

Figure 2:
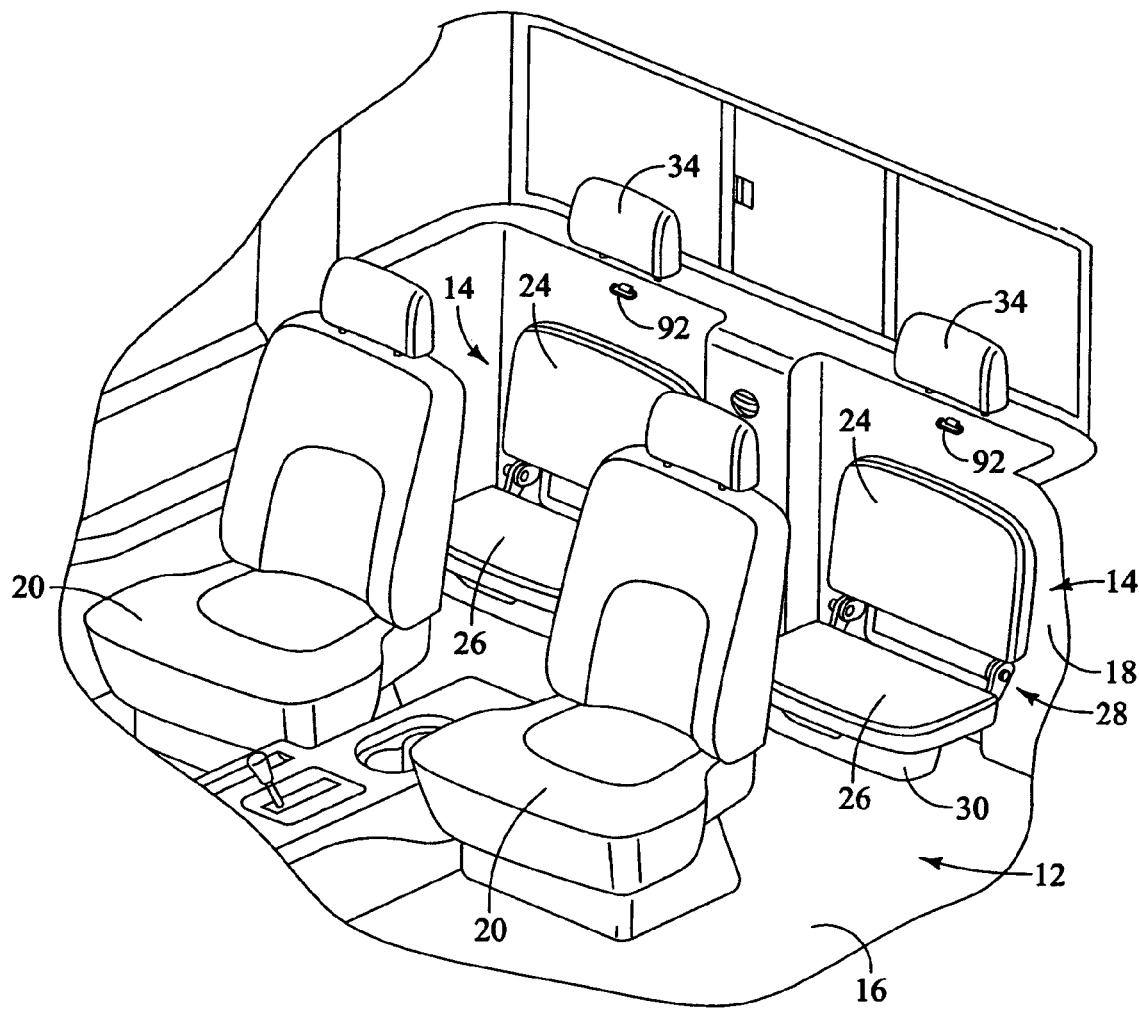
FIG. 2 is a partial perspective view of a passenger compartment of the pickup truck depicted in FIG. 1, showing a front row of seats and a rear row of seats that form part of the rear seating arrangement in accordance with the present invention.
Figure 3:
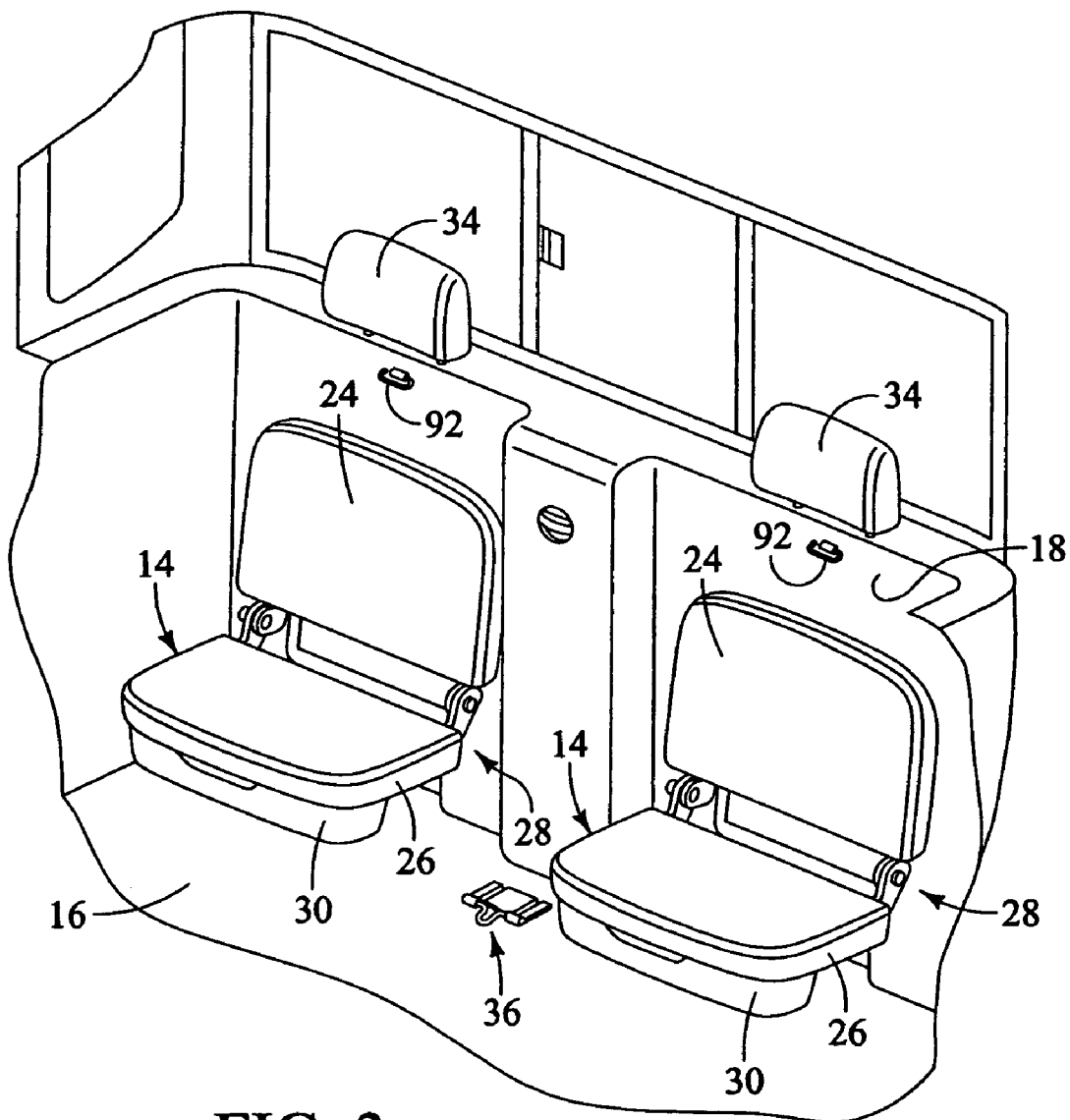
FIG. 3 is another partial perspective view of the passenger compartment showing the rear seats of the rear seating arrangement, with each rear seat including an extension portion, with the rear seats in a seating position and the extension portions in a stowed position in accordance with the present invention.

The seat back portion 24 is arranged generally perpendicular to the seat bottom portion 26, when the seat bottom portion 26 in a horizontal seating position, as shown in FIGS. 2 and 3. The seat back portion 24 is supported on the rear wall 18 of the passenger compartment 12 by the seat attachment part 22. The seat back portion 24 is a generally rigid member that can optionally include padding (not shown) and a cloth cover (not shown) as needed and/or desired. For example, the seat back portion 24 can be a one-piece, unitary member mold from a hard rigid plastic material with the seat attachment part 22 fastened to the back surface in any conventional manner. The lower end of the seat back portion 24 includes a tether routing ring 40 (FIGS. 6 and 8) for routing one of the tether straps 38 therethrough as shown in FIG. 11.

Figure 4:
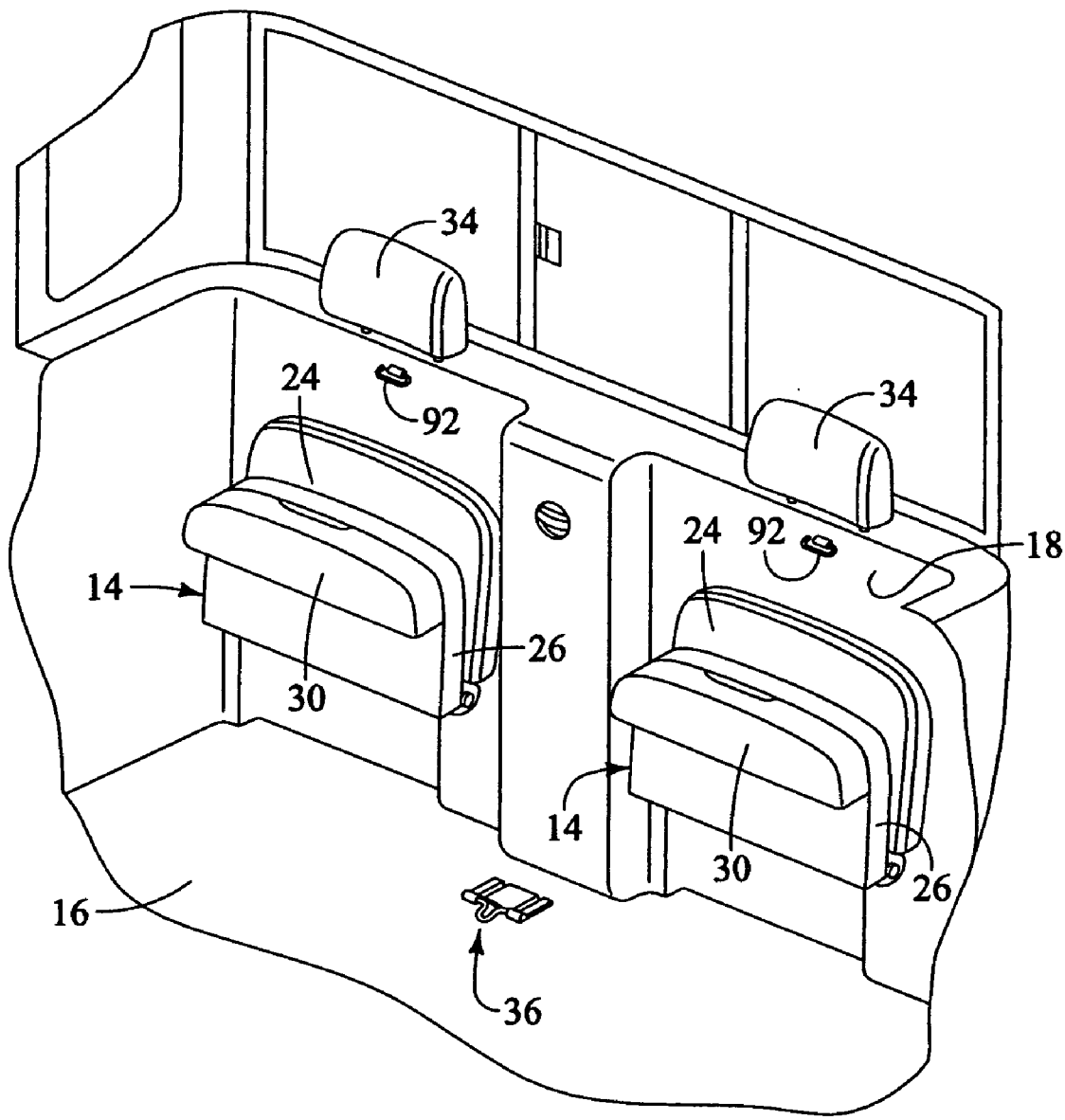
FIG. 4 is another partial perspective view of the passenger compartment similar to FIG. 3, showing the rear seats of the rear seating arrangement in a stowed or retracted position in accordance with the present invention.
Figure 5:
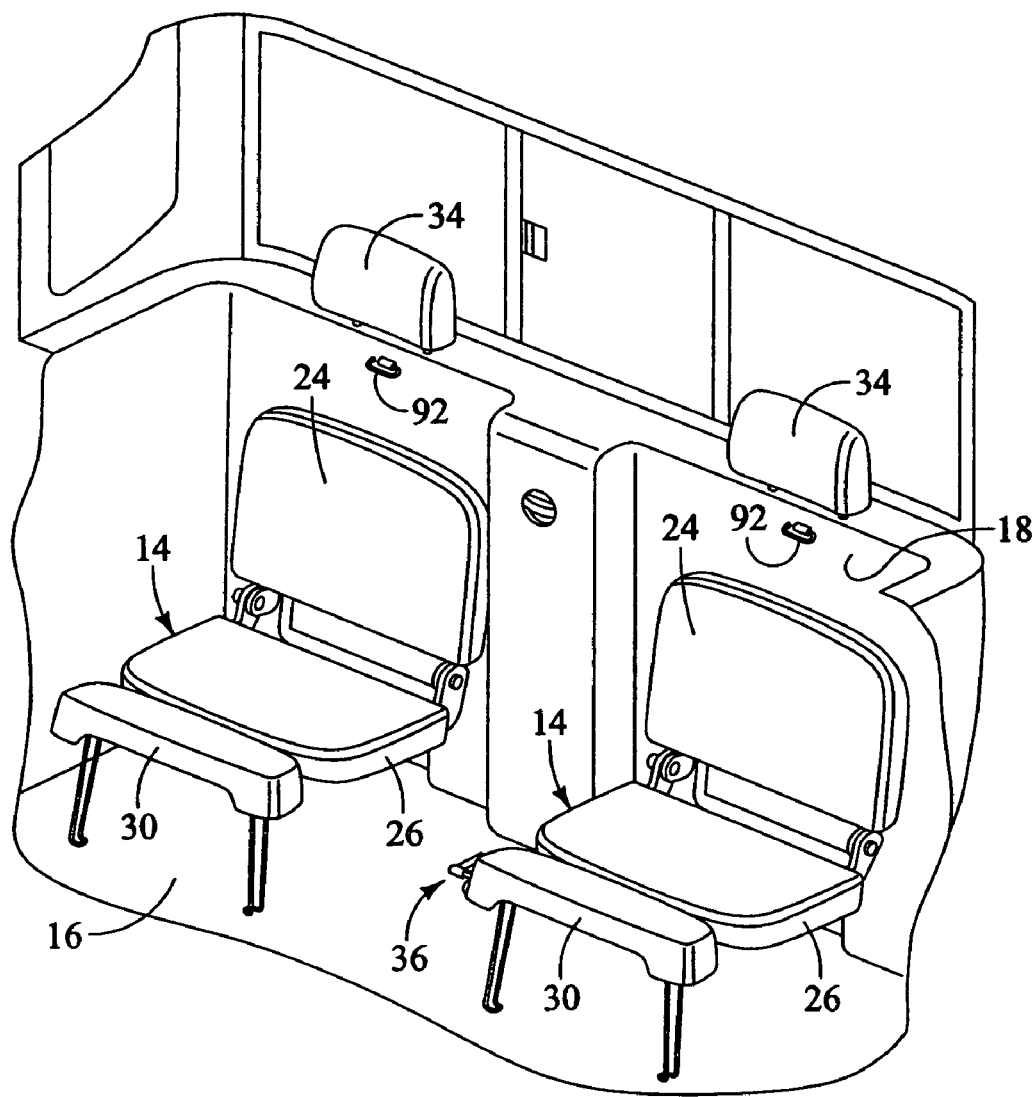
FIG. 5 is another partial perspective view of the passenger compartment similar to FIG. 3, showing the rear seats in a seating position, and the extension portions in an extended position in accordance with the present invention.

The seat bottom portion 26 is pivotally coupled to the seat attachment part 22 by the main seat hinge 28 for movement between the horizontal seating position shown in FIGS. 2 and 3, and a vertical retracted or stowed position shown in FIG. 4. The seat extension portion 30 is pivotally coupled to the seat bottom portion 26 by the extension seat hinge 32 for movement between a retracted or stowed position beneath the seat bottom portion 26 as shown in FIGS. 2–4 and a horizontal seat extending position shown in FIGS. 5, 7 and 9.

As shown in FIG. 7, the seat bottom portion 26 is a generally rigid member that can optionally include padding (not shown) and a cloth cover (not shown) as needed and/or desired. For example, the seat bottom portion 26 is preferably formed of two main parts, e.g., a metal seat support bracket 48 and a rigid seat member 50. The seat member 50 is preferably a one-piece, unitary member mold from a hard rigid plastic material with the seat support bracket 48 fastened to the bottom surface in any conventional manner. The seat support bracket 48 acts as a hinge attachment member for the seat member 50. In other words, the main seat hinge 28 and the extension seat hinge 32 are attached to the seat member 50 via the support bracket 48.

As shown in FIG. 6, the seat member 50 includes a peripheral wall part 51 with a front end edge 51a and a seat support part 52 with an upper seating surface 52a. The seat support bracket 48 is fastened to the bottom surface of the seat member 50. The main seat hinge 28 is coupled between the seat support bracket 48 and the seat attachment part 22 about a generally horizontal pivot axis.

Figure 8:
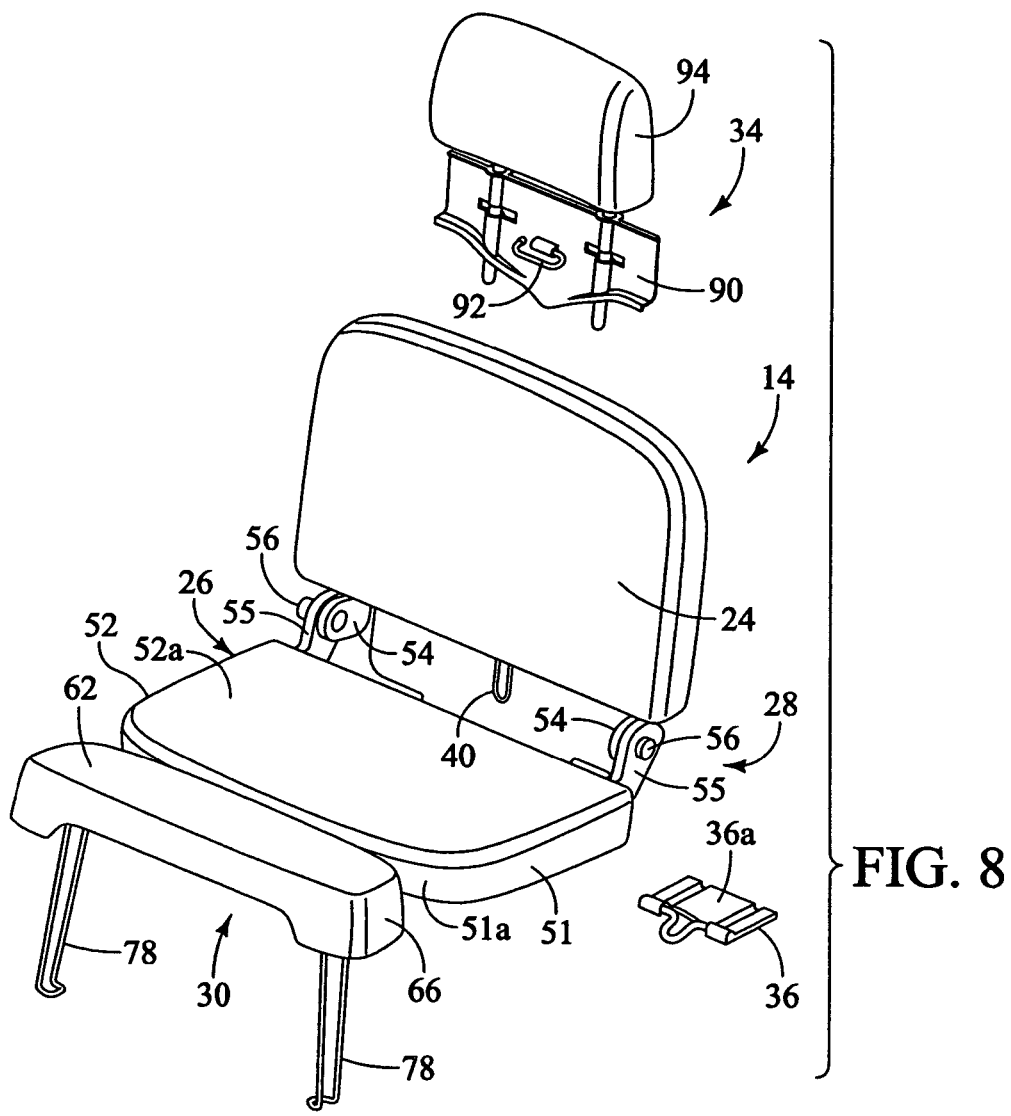
FIG. 8 is another enlarged perspective view of one rear seat of the rear seating arrangement showing the extension portion in the extended position in accordance with the present invention.

As shown in FIG. 8, the main seat hinge 28 basically includes a pair of first hinge support parts 54, a second pair of second hinge support parts 55 and a pair of pivot pins 56 pivotally joining the first hinge support parts 54 to the second hinge support parts 55. The first hinge support parts 54 are fixed to the seat attachment part 22, while the second hinge support parts 55 are fixed to the seat support bracket 48. The first hinge support parts 54 can be either integrally formed with the seat attachment part 22 as a one-piece member from a stamped sheet metal material or can be separate members that are fastened together. Likewise, the second hinge support parts 55 can be either integrally formed with the seat support bracket 48 as a one-piece member from a stamped sheet metal material or can be separate members that are fastened together. the first and second hinge support parts 54 and 55 are configured and arranged to restrict movement of the seat bottom portion 26 relative to the seat back portion 24 such that the seat bottom portion 26 moves between the horizontal seating position and the vertical retracted position in a conventional manner. Accordingly, by moving the seat bottom portion 26 to the vertical retracted position, the area of the passenger compartment 12 proximate the seat assembly 14 can be used for cargo.

As shown in FIGS. 6–10, the seat extension portion 30 is preferably formed with a main shell body 60 that defines an extension seating surface 62, a hollow interior 64, an annular peripheral edge 66. The seat extension portion 30 also preferably includes a support assembly 68 that is fixed to the main shell body 60 such that the support assembly 68 can be completely retracted in to the hollow interior 64 of the main shell body 60.

The main shell body 60 is preferably a one-piece, unitary member mold from a hard rigid plastic material. The main shell body 60 is configured such that with the extension portion 30 in the seat extending position, the extension seating surface 62 is generally co-planar and aligned with the upper seating surface 52a of the seat bottom portion 26. Since the extension seating surface 62 of the extension portion 30 is generally co-planar with the upper seating surface 52a of the seat bottom portion 26 with the extension portion 30 in the seat extending position, a larger surface is formed for receiving and supporting cargo or a child restraining safety seat S, as shown in FIG. 11.

The peripheral edge 66 of the main shell body 60 extends lengthwise along a portion of the seat extension portion 30. The peripheral edge 66 is configured and arranged such that it conforms generally to the front end edge 51a of the seat bottom portion 26 when the seat extension portion 30 is in the stowed position. Specifically, in the stowed position, the edge 66 and frond end edge 51 are generally parallel throughout their length. Preferably, the peripheral edge 66 is rearwardly space apart from the front end edge 51a when the seat extension portion 30 in the stowed position, as shown in FIG. 6.

Figure 10:
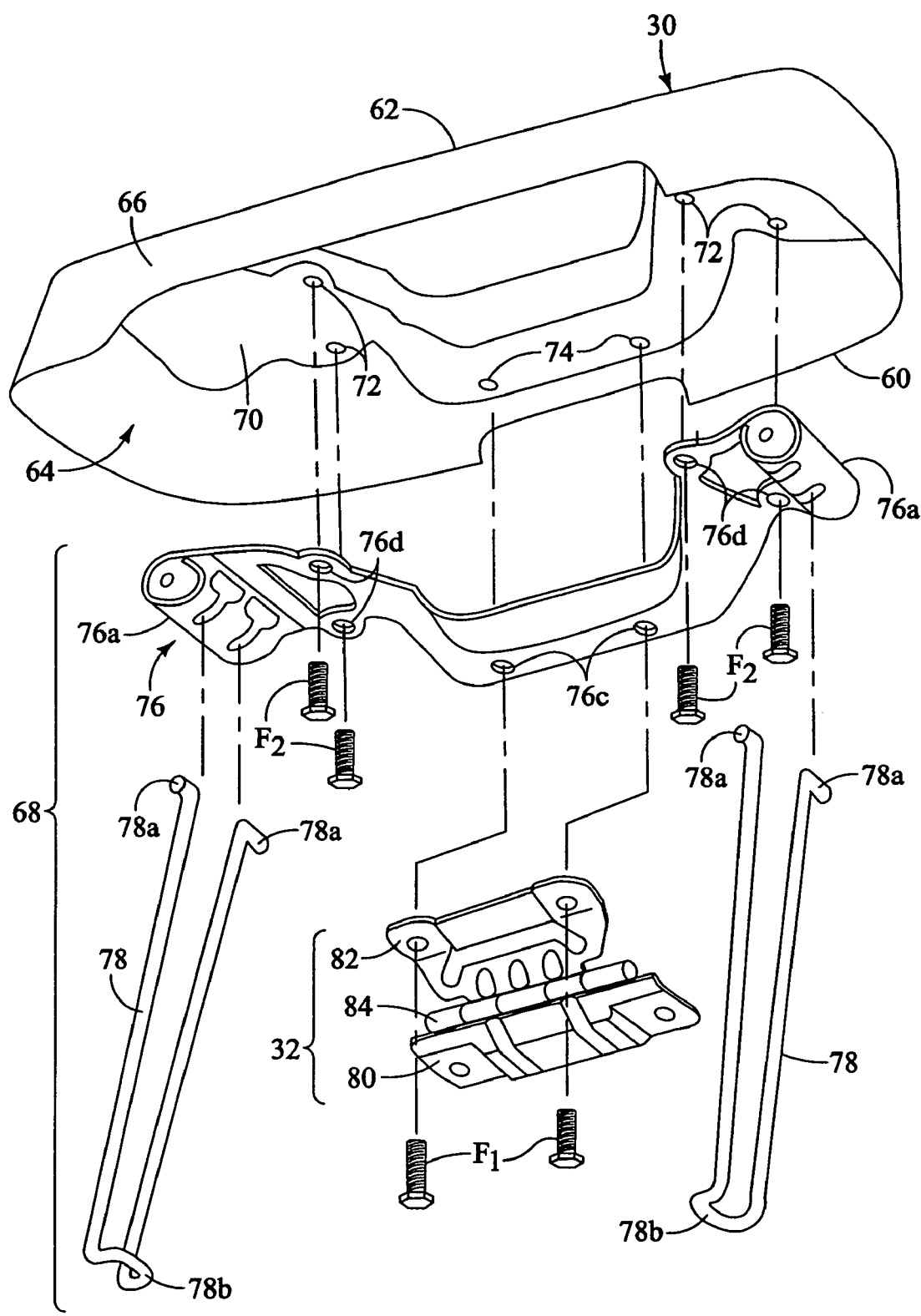
FIG. 10 is an exploded view showing various portions of the extension portion in accordance with the present invention.

As shown in FIG. 10, the main shell body 60 is formed with reinforced portions 70 that provide the main shell body 60 with sufficient strength to attach and support the support assembly 68. Furthermore, the reinforced portions 70 are formed with a plurality of threaded apertures 72 and 74 for attaching the support assembly 68 to the main shell body 60. Of course, other types of attachment structures can be used as needed and/or desired.

Still referring to FIG. 10, the support assembly 68 basically includes a metal support bracket 76 and a pair of extensible support legs 78. The support bracket 76 has a serpentine-like shape with a pair of leg support structures 76a formed at each end for receiving the support legs 78 and a central hinge mounting section 76b with a pair of hinge mounting apertures 76c for receiving a pair of fasteners $F_1$. The support bracket 76 also has four additional mounting apertures 76d for receiving fasteners $F_1$. Thus, the support bracket 76 is fixedly attached to the seat extension portion 30 via the fasteners $F_1$ that extend through the apertures 76d and into the threaded apertures 72 of the extension portion 30.

Figure 9:
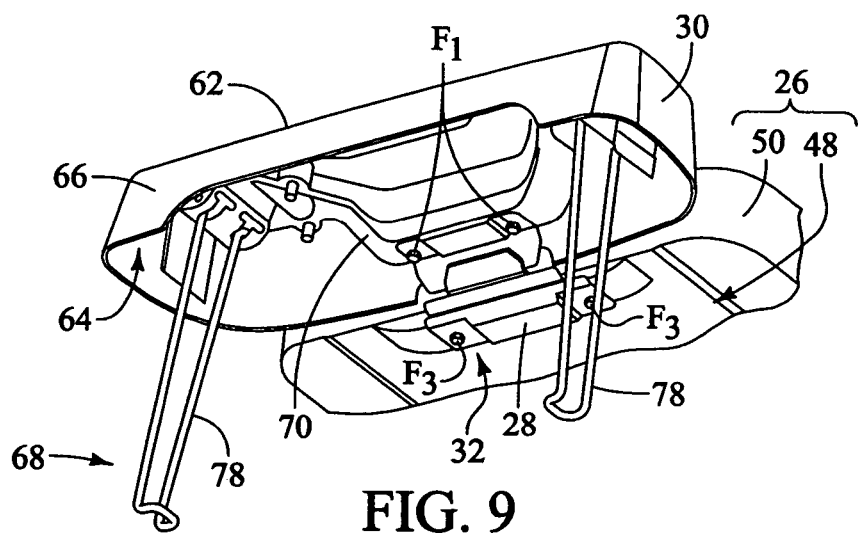
FIG. 9 is a perspective view showing the underside of the rear seat including the extension portion with support legs in an extended position in accordance with the present invention.

The support legs 78 are preferably formed of a metal rod that is coated with a nylon coating. Each of the support legs 78 has a pair of pivot pin projections 78a at a first end and a foot 78b at the opposite end. The pivot pin projections 78a are fitted into the leg support structures 76a which are configured to allow movement of the support legs 78 between a retracted position as shown in FIG. 6 and an extended position as shown in FIGS. 8 and 9. As indicated in FIGS. 9 and 10, the extension seat hinge 32 is fixedly attached to the support bracket 76 and the main shell body 60 of the extension portion 30 by the fasteners $F_1$ that are inserted into the apertures 76d and into the threaded apertures 72 of the extension portion 30.

In the retracted position, the support legs 78 are completely disposed or retained within the hollow interior 64 of the main shell body 60 of the extension portion 30, as shown in FIG. 7. In the extended position shown in FIGS. 8 and 9, the support legs 78 extend at least partially outside the hollow interior 64 of the main shell body 60 and are configured to contact the floor 16, thereby supporting the extension portion 30 on the floor 16.

As shown in FIG. 9, the extension seat hinge 32 is fixedly attached between the seat bottom portion 26 and the seat extension portion 30. Accordingly, the seat extension portion 30 is pivotal between a stowed position beneath the seat bottom portion 26 as shown in FIGS. 2, 3, 4 and 6 and a seat extending position shown in FIGS. 5, 8 and 9. The extension seat hinge 32 basically includes a first attachment part or portion 80, a second attachment part or portion 82 and a hinge pin 84, as shown more clearly in FIG. 10. The first attachment part 80 is shaped and configured for attachment to the seat support bracket 48 of the seat bottom portion 26 by a pair of fasteners $F_3$, as shown in FIG. 9. The second attachment part 82 is shaped and configured for attachment to the seat extension portion 30 by the fasteners $F_1$. The hinge pin 84 extends through portions of the first and second attachment parts 80 and 82 allowing pivotal movement therebetween. However, it should be understood from the drawings and description herein that any of a variety of hinge mechanisms can be employed for supporting the seat extension portion 30 on the seat bottom portion 26. For example, a parallelogram type hinge mechanism, cantilever mechanism or sliding mechanism can also be used such that the seat extension portion 30 is moved under the seat bottom portion 26.

The headrest assembly 34 is fixedly attached to the rear wall 18, as shown in FIG. 11. The headrest assembly 34 basically includes a bracket 90, a child restraining seat tether hook 92 and a head rest 94, as shown in FIGS. 8 and 11. The tether hook 92 is basically a U-shaped hook that is pivotally attached to the bracket 90 for receiving one of the child restraining seat tethers 38 therethrough.

The tether hook 36 has a base plate 36a that is fixedly attached to the passenger compartment 12 beneath the seat attachment part 22 of the seat assembly 14. Preferably, the base plate 36a can be attached to the floor 16 by fasteners (not shown) or welding techniques. Alternative, the base plate 36a can be attached to a lower portion of the rear wall 18 as needed and/or desired.

As indicated in FIG. 11, the child safety seat S can be tethered in place on the seat bottom portion 26 and the extension portion 30 by a seatbelt (not shown) and the seat tethers 38. Specifically, one of the seat tethers 38 can be attached to a rear portion of the child safety seat S and routed through the tether hook 92 and finally attached to the tether hook 36. A second one of the seat tethers 38 can be attached to a lower portion of the child safety seat S and routed through the tether hook 48 and finally attached to the tether hook 36.

In illustrated embodiment, the rear seating arrangement of the present invention is provided with the seat bottom portion 26 having the extension portion 30 mounted for movement a retracted or stowed position beneath the seat bottom portion 26 as shown in FIGS. 2–4 and a horizontal seat extending position shown in FIGS. 5 and 6. Thus, the seat assembly provides a simple, easy to use feature of the rear seating arrangement of the present invention where the rear portion of the passenger compartment 12 can be used for carrying cargo, a passenger or a child safety seat.

As used herein to describe the above embodiment, the following directional terms "forward, rearward, above, downward, vertical, horizontal, below and transverse" as well as any other similar directional terms refer to those directions of a vehicle equipped with the present invention.

Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle rear seating arrangement comprising:
    a vehicle passenger compartment structure having a generally vertical surface; and
    a seat assembly including a seat attachment part, a seat bottom portion with an upper seating surface, a seat extension portion with an extension seating surface and a first hinge,
    the seat attachment part being fixedly attached to the generally vertical surface of the vehicle passenger compartment structure,
    the seat bottom portion having a front end edge and a rear end edge, the seat bottom portion being pivotally supported to the seat attachment part adjacent to the rear end edge by the first hinge for movement between a generally horizontal seating position and a generally vertical retracted position,
    the seat extension portion being pivotally supported the seat bottom portion adjacent to the front end edge for movement between a stowed position and a seat extending position such that in the stowed position the seat extension portion is disposed underneath the seat bottom portion with the seat bottom portion in the generally horizontal seating position and in the seat extending position the upper seating surface and the extension seating surface are generally aligned.

2. The vehicle rear seating arrangement as set forth in claim 1, wherein
    the seat extension portion includes an edge that conforms generally to the front end edge of the seat bottom portion when the seat extension portion is in the stowed position.

3. The vehicle rear seating arrangement as set forth in claim 1, wherein
    the seat extension portion includes a table shell member having a peripheral side wall extending downward from the extension seating surface with the seat extension portion in the seat extending position, the table shell member having an open hollow interior.

4. The vehicle rear seating arrangement as set forth in claim 3, wherein
    the seat extension portion includes an extensible support moveably supported by the table shell member for movement between a retracted position within the hollow interior of the table shell member and a supporting position in which the extensible support at least partially extends outside the hollow interior of the table shell member.

5. The vehicle rear seating arrangement as set forth in claim 4, wherein
    the vehicle passenger compartment structure includes a generally horizontal surface with the extensible support being configured and arranged to be supported on the generally horizontal surface of the vehicle passenger compartment structure when the extensible support is in the supporting position.

6. The vehicle rear seating arrangement as set forth in claim 1, wherein
    the seat assembly further includes a second hinge fixedly attached between the seat bottom portion and the seat extension portion such that the seat extension portion is pivoted between the stowed position and the seat extending position.

7. The vehicle rear seating arrangement as set forth in claim 1, wherein
    the seat assembly further includes a seat back portion arranged generally perpendicular to the seat bottom portion with the seat bottom portion in the generally horizontal seating position.

8. The vehicle rear seating arrangement as set forth in claim 7, wherein
    the seat back portion is attached to the generally vertical surface of the vehicle passenger compartment structure by the seat attachment part.

9. The vehicle rear seating arrangement as set forth in claim 1, further comprising
    a first child restraining seat tether bracket fixedly attached to the vehicle passenger compartment structure beneath the seat attachment part of the seat assembly.

10. The vehicle rear seating arrangement as set forth in claim 9, further comprising
    a second child restraining seat tether bracket fixed to the vehicle passenger compartment structure above the seat attachment part of the seat assembly.

11. The vehicle rear seating arrangement as set forth in claim 1, further comprising:
    a child restraining seat tether bracket fixed to the generally vertical surface of the vehicle passenger compartment structure above the seat attachment part of the seat assembly.

12. A vehicle rear seating arrangement comprising:
    a vehicle passenger compartment structure; and
    a seat assembly including a seat attachment part, a seat bottom portion with an upper seating surface and a seat extension portion with an extension seating surface,
    the seat attachment part being fixedly attached to the vehicle passenger compartment structure,
    the seat extension portion being supported by the seat bottom portion for movement between a stowed position underneath the seat bottom portion and a seat extending position such that the upper seating surface and the extension seating surface are generally aligned in the seat extending position,
    the seat extension portion includes a table shell member having a peripheral side wall extending downward from the extension seating surface with the seat extension portion in the seat extending position, the table shell member having an open hollow interior surrounded,
    the seat extension portion also includes an extensible support moveably supported by the table shell member for movement between a retracted position within the hollow interior of the table shell member and a supporting position in which the extensible support at least partially extends outside the hollow interior of the table shell member, and the extensible support includes a support bracket mounted within the hollow interior of the table shell member and a pair of extensible support members pivotally coupled to the support bracket.

13. The vehicle rear seating arrangement as set forth in claim 12, wherein
the seat assembly further includes a hinge fixedly attached between the seat bottom portion and the seat extension portion such that the seat extension portion is supported by the hinge for pivotal movement between the stowed position and the seat extending position.

14. A vehicle rear seating arrangement comprising:
a vehicle passenger compartment structure having a generally vertical surface; and
a seat assembly including a seat attachment part, a seat bottom portion with an upper seating surface and a seat extension portion with an extension seating surface,
the seat attachment part being fixedly attached to the vehicle passenger compartment structure,
the seat extension portion being supported by the seat bottom portion for movement between a stowed position underneath the seat bottom portion and a seat extending position such that the upper seating surface and the extension seating surface are generally aligned in the seat extending position,
a child restraining seat tether bracket fixed to the generally vertical surface above the seat attachment part, and
a headrest fixed to the child restraining seat tether bracket.

15. A vehicle rear seating arrangement comprising:
a vehicle passenger compartment structure; and
a seat assembly including a seat attachment part, a seat bottom portion and a seat extension portion,
the seat attachment part being fixedly attached to the vehicle passenger compartment structure,
the seat bottom portion having an upper seating surface and an underside surface,
the seat extension portion having an extension seating surface and a second surface opposite the extension seating surface, the seat extension portion being supported by the seat bottom portion for movement between a stowed position underneath the seat bottom portion where the second surface of the seat extension portion confronts the underside surface of the seat bottom portion and a seat extending position where the upper seating surface and the extension seating surface are generally aligned.

16. The vehicle rear seating arrangement as set forth in claim 15, wherein
the seat bottom portion further includes at least one hinge that supports the seat extension portion for pivotal movement between the stowed position and the seat extending position in a range of movement of approximately 180 degrees with respect to the at least one hinge.

17. A vehicle rear seating arrangement comprising:
a vehicle passenger compartment structure; and
a seat assembly including a seat bottom portion and a seat extension portion,
the seat bottom portion having a front end and a rear end, the seat bottom portion being pivotally coupled to the vehicle passenger compartment structure adjacent to the rear end for movement between a generally horizontal seating position and a generally vertical retracted position,
the seat extension portion being pivotally coupled to the seat bottom portion adjacent to the front end for movement with respect to the seat bottom portion between a seat extending position with the seat bottom portion in the generally horizontal seating position and a stowed position underneath the seat bottom portion, wherein the seat extension portion moves with the seat bottom portion between the generally horizontal seating position and the generally vertical retracted position.

18. The vehicle rear seating arrangement as set forth in claim 17, wherein
the seat extension portion is configured and arranged such that the seat extension portion is movable between the stowed position and the seat extending position in a range of movement of approximately 180 degrees.

* * * * *